US00RE49743E

(19) United States
(12) Reissued Patent
Bauer et al.

(10) Patent Number: US RE49,743 E
(45) Date of Reissued Patent: Dec. 5, 2023

(54) CATALYST FOR OXIDISING AMMONIA

(71) Applicant: Johnson Matthey Public Limited Company, London (GB)

(72) Inventors: Juergen Bauer, Redwitz (DE); Mikael Larsson, Gothenburg (SE); Jing Lu, Wayne, PA (US)

(21) Appl. No.: 17/225,608

(22) Filed: Apr. 8, 2021

Related U.S. Patent Documents

Reissue of:
(64) Patent No.: 10,569,264
Issued: Feb. 25, 2020
Appl. No.: 16/081,442
PCT Filed: Feb. 3, 2017
PCT No.: PCT/GB2017/050274
§ 371 (c)(1),
(2) Date: Aug. 31, 2018
PCT Pub. No.: WO2017/134454
PCT Pub. Date: Aug. 10, 2017

U.S. Applications:
(60) Provisional application No. 62/290,633, filed on Feb. 3, 2016.

(30) Foreign Application Priority Data

May 17, 2016 (GB) ..... 1608626

(51) Int. Cl.
*F01N 3/28* (2006.01)
*B01J 35/04* (2006.01)
(Continued)

(52) U.S. Cl.
CPC ..... *B01J 35/04* (2013.01); *B01D 53/8634* (2013.01); *B01D 53/9418* (2013.01);
(Continued)

(58) Field of Classification Search
CPC ..... B01J 29/064; B01J 29/56; B01J 29/049; B01J 35/10; B01J 23/44; B01J 23/42;
(Continued)

(56) References Cited

U.S. PATENT DOCUMENTS 4,663,024 A 5/1987 Olson et al.
5,516,497 A 5/1996 Speronello
(Continued)

FOREIGN PATENT DOCUMENTS

CN 1819872 A 8/2006
CN 106659974 A 5/2017
(Continued)

OTHER PUBLICATIONS

Casagrande et al., "SCR of NO by NH3 over TiO2-supported V2O5-Mo03 catalysts: reactivity and redox behavior", Applied Catalysis B: Environmental, 22 (1999) 63-77.
(Continued)

*Primary Examiner* — Ling X Xu
*Assistant Examiner* — Alan Diamond

(57) ABSTRACT

A catalyst for oxidising ammonia comprises a selective catalytic reduction (SCR) catalyst and a composite heterogeneous extruded honeycomb having longitudinally extending parallel channels, which channels being defined in part by channel walls having a total longitudinal length, wherein the channel walls comprise a pore structure including a periodic arrangement of porous cells embedded in an inorganic matrix component, at least some of which porous cells are defined at least in part by an active interface layer of a catalytically active material comprising a precious metal supported on particles of a support material.

23 Claims, 6 Drawing Sheets

Figure 1:
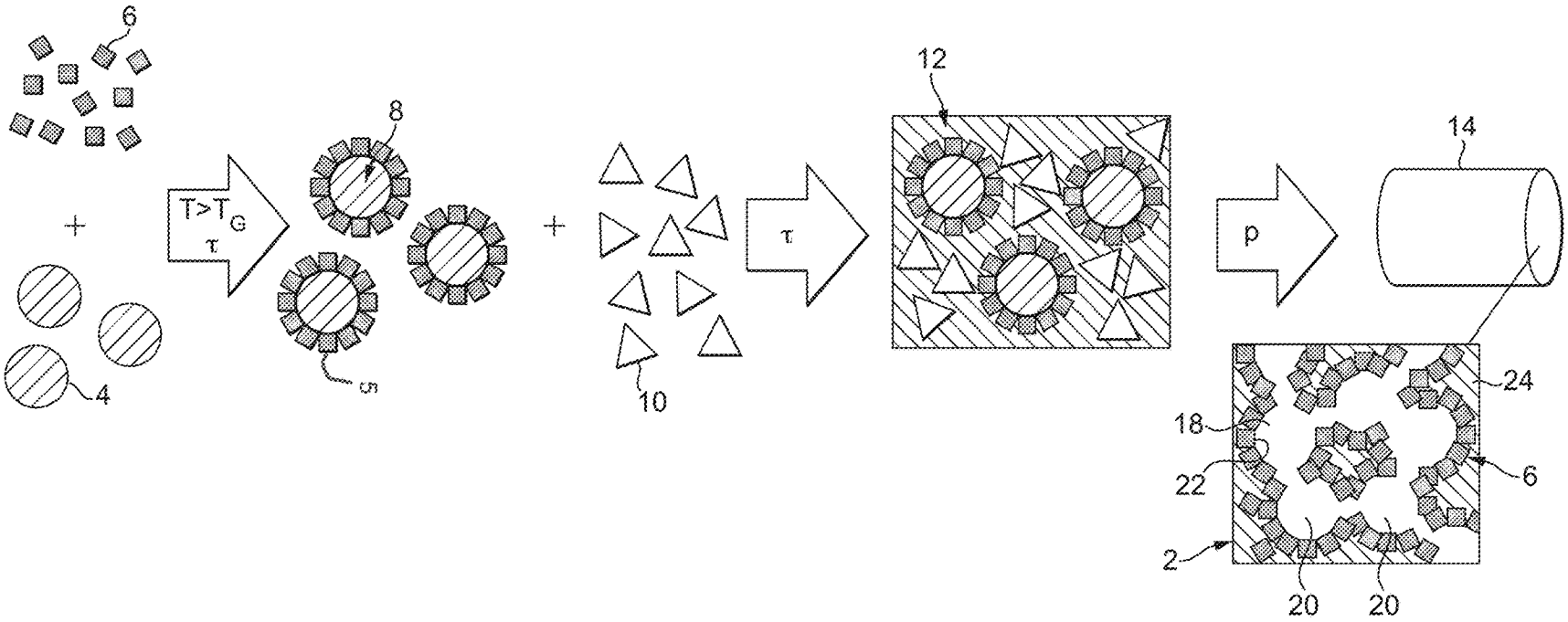

(51) Int. Cl.

| | |
|---|---|
| ***B01J 23/22*** | (2006.01) |
| ***B01D 53/94*** | (2006.01) |
| ***B01D 53/86*** | (2006.01) |
| ***B01J 23/42*** | (2006.01) |
| ***B01J 23/44*** | (2006.01) |
| ***B01J 23/50*** | (2006.01) |
| ***B01J 23/52*** | (2006.01) |
| ***B01J 29/14*** | (2006.01) |
| ***B01J 29/56*** | (2006.01) |
| ***B01J 29/76*** | (2006.01) |
| ***F01N 3/10*** | (2006.01) |
| ***F01N 3/20*** | (2006.01) |
| ***B01J 23/48*** | (2006.01) |
| ***B01J 29/04*** | (2006.01) |
| ***B01J 29/064*** | (2006.01) |
| ***B01J 29/072*** | (2006.01) |
| ***B01J 35/10*** | (2006.01) |
| ***B01J 37/00*** | (2006.01) |

(52) U.S. Cl.

CPC ..... *B01D 53/9436* (2013.01); *B01J 23/22* (2013.01); *B01J 23/42* (2013.01); *B01J 23/44* (2013.01); *B01J 23/48* (2013.01); *B01J 23/50* (2013.01); *B01J 23/52* (2013.01); *B01J 29/049* (2013.01); *B01J 29/064* (2013.01); *B01J 29/072* (2013.01); *B01J 29/14* (2013.01); *B01J 29/56* (2013.01); *B01J 29/76* (2013.01); *B01J 29/763* (2013.01); *B01J 29/7615* (2013.01); *B01J 35/10* (2013.01); *B01J 37/0018* (2013.01); *F01N 3/106* (2013.01); *F01N 3/2066* (2013.01); *F01N 3/2828* (2013.01); *B01D 2255/104* (2013.01); *B01D 2255/106* (2013.01); *B01D 2255/1021* (2013.01); *B01D 2255/1023* (2013.01); *B01D 2255/20707* (2013.01); *B01D 2255/20723* (2013.01); *B01D 2255/20738* (2013.01); *B01D 2255/20761* (2013.01); *B01D 2255/9155* (2013.01); *B01D 2258/01* (2013.01); *B01D 2258/0283* (2013.01); *F01N 2330/06* (2013.01); *F01N 2330/30* (2013.01); *F01N 2370/04* (2013.01); *F01N 2510/063* (2013.01); *F01N 2610/02* (2013.01)

(58) Field of Classification Search

CPC ..... B01J 35/04; B01J 29/7615; B01J 23/52; B01J 37/0018; B01J 23/50; B01J 23/22; B01J 29/76; B01J 29/763; B01J 23/48; B01J 29/14; B01J 29/072; B01D 53/8634; B01D 3/9436; B01D 3/9418; B01D 2255/20761; B01D 2258/01; B01D 2255/9155; B01D 255/1021; B01D 2255/20707; B01D 2255/106; B01D 2258/0283; B01D 2255/20723; B01D 2255/20738; B01D 2255/104; F01N 3/106; F01N 3/2066; F01N 3/2828; F01N 2510/063; F01N 2330/30; F01N 2370/04; F01N 2330/06; F01N 2610/02

See application file for complete search history.

(56) References Cited

U.S. PATENT DOCUMENTS

| | | | | |
|---|---|---|---|---|
| 5,679,313 | A | 10/1997 | Nojima | |
| 7,410,626 | B2 | 8/2008 | Tran | |
| 10,441,918 | B2 * | 10/2019 | Bauer | F01N 3/2066 |
| 2005/0085383 | A1 * | 4/2005 | Hoj | B01D 53/8628 502/412 |
| 2010/0166628 | A1 | 7/2010 | Soeger | |
| 2011/0078997 | A1 * | 4/2011 | Boorse | B01D 53/9445 60/274 |
| 2011/0257006 | A1 | 10/2011 | Thieuleux | |
| 2013/0059724 | A1 | 3/2013 | Hirose | |
| 2013/0149223 | A1 | 6/2013 | Blakeman | |
| 2014/0161693 | A1 | 6/2014 | Brown | |
| 2014/0271426 | A1 * | 9/2014 | Casci | B01D 53/9418 423/213.2 |
| 2015/0367334 | A1 | 12/2015 | Sadaoka | |

FOREIGN PATENT DOCUMENTS

| | | | |
|---|---|---|---|
| EP | 2522435 | A1 | 11/2012 |
| GB | 2522435 | A | 7/2015 |
| RU | 2009132612 | A | 3/2011 |
| WO | 2004110622 | A1 | 12/2004 |
| WO | 2005016497 | A1 | 2/2005 |
| WO | 2006023932 | A1 | 3/2006 |
| WO | 2008106519 | A1 | 9/2008 |
| WO | 2008106523 | | 9/2008 |
| WO | 2008106523 | A2 | 9/2008 |
| WO | 2009001131 | | 12/2008 |
| WO | 2009001131 | A1 | 12/2008 |
| WO | 2010062730 | A2 | 6/2010 |
| WO | 2010062730 | A3 | 7/2010 |
| WO | 2014027198 | A1 | 2/2014 |
| WO | 2015110822 | A1 | 7/2015 |
| WO | 2016016622 | A1 | 2/2016 |
| WO | 2017072546 | A1 | 5/2017 |

OTHER PUBLICATIONS

Serrano et al., "Synthesis strategies in the search for hierarchical zeolites", Chem. Soc. Rev., 2013, 42, 4004-4035.

Aranzabal et al., "Optimization of Process Parameters on the Extrusion of Honeycomb Shaped Monolith of H-ZSM-5 Zeolite", Chemical Engineering Journal, 162, May 2010, pp. 415-423.

Dasagrande et al., Applied Catalysis B: Environmental, 22 (1999) 63-77).

* cited by examiner

AMENDED

CATALYST FOR OXIDISING AMMONIA

Matter enclosed in heavy brackets [ ] appears in the original patent but forms no part of this reissue specification; matter printed in italics indicates the additions made by reissue; a claim printed with strikethrough indicates that the claim was canceled, disclaimed, or held invalid by a prior post-patent action or proceeding.

*CROSS-REFERENCE TO RELATED APPLICATIONS*

*This is a reissue application of U.S. patent application Ser. No. 16/081,442, filed Aug. 31, 2018, now U.S. Pat. No. 10,569,264, issued Feb. 25, 2020, which is a National Stage of International Application No. PCT/GB2017/050274, filed Feb. 3, 2017, which claims the benefit of U.S. Provisional Application No. 62/290,633, filed Feb. 3, 2016, and of GB Application No. 1608626.6; Country GB, filed May 17, 2016.*

The invention relates to a catalyst for treating combustion exhaust gas and in particular to a catalyst for oxidising ammonia used as a reducing agent for reducing oxides of nitrogen in a selective catalytic reduction reaction to dinitrogen (so-called "slip" ammonia) or for oxidising ammonia in an exhaust gas of a nitric acid plant.

Combustion of hydrocarbon-based fuel in electrical power stations such as gas turbines and in vehicular engines produces flue or exhaust gas that contains, in large part, relatively benign dinitrogen ($N_2$), water vapour ($H_2O$), and carbon dioxide ($CO_2$). But the flue and exhaust gases also contain, in relatively small part, noxious and/or toxic substances, such as carbon monoxide (CO) from incomplete combustion, hydrocarbons (HC) from un-burnt fuel, nitrogen oxides ($NO_x$) fixed from atmospheric dinitrogen from relatively high combustion temperatures, and particulate matter (solid particulate soot or a combination of solid particulate soot and adsorbed liquid hydrocarbons). To mitigate the environmental impact of flue and exhaust gas released into the atmosphere, it is desirable to eliminate or reduce the amount of the undesirable components, preferably by a process that, in turn, does not generate other noxious or toxic substances.

Typically, flue gases from electrical power stations and exhaust gases from vehicular engines have a net oxidizing effect due to the relatively high proportion of oxygen and other oxidising species including $NO_x$ contained therein to ensure as complete combustion of the hydrocarbon fuel as possible. Of the legislated pollutants present in such exhaust gases, one of the more difficult components to remove is $NO_x$, which includes nitric oxide (NO), nitrogen dioxide ($NO_2$), and nitrous oxide ($N_2O$); collectively "oxides of nitrogen" or "$NO_x$". The reduction of $NO_x$ to $N_2$ is particularly problematic because the exhaust gas contains excess oxygen and oxidising species, an environment which favours oxidative reactions instead of reduction reactions. Notwithstanding, $NO_x$ can be reduced by a process commonly known as Selective Catalytic Reduction (SCR).

A SCR process involves the conversion of $NO_x$, in the presence of a catalyst and a nitrogenous reducing agent (or "reductant"), such as ammonia, into elemental nitrogen ($N_2$) and water. In an SCR process, a gaseous reductant such as ammonia or an ammonia precursor such as urea is added to an exhaust gas stream containing the $NO_x$ prior to contacting the mixture with the SCR catalyst. The reductant is adsorbed onto the catalyst and the $NO_x$ reduction reaction takes place as the gases pass through or over the catalysed substrate. The chemical equations for stoichiometric SCR reactions using ammonia as reductant are:

$$4NO+4NH_3+O_2 \rightarrow 4N_2+6H_2O$$

$$2NO_2+4NH_3+O_2 \rightarrow 3N_2+6H_2O$$

$$NO+NO_2+2NH_3 \rightarrow 2N_2+3H_2O$$

SCR catalysts are known and include vanadia-based catalysts supported on titania (see L. Casagrande et al., Applied Catalysis B: Environmental, 22 (1999) 63-77); and zeolites promoted with transition metals such as copper or iron (see U.S. Pat. No. 5,516,497; and WO 2008/106519). It is also known to incorporate a SCR catalyst into a filter substrate to remove both particulate matter and $NO_x$ (see WO 2005/016497).

Most SCR processes utilize a stoichiometric excess of ammonia in order to maximize the conversion of $NO_x$. Unreacted excess ammonia that passes through the SCR process leaving the SCR catalyst unreacted (also referred to as "ammonia slip") is undesirable, because the released ammonia gas can negatively impact the atmosphere, can react with other combustion species to create smog, has an unpleasant odour and is an irritant to mucosal surfaces, such as in the eyes and nose. To reduce ammonia slip, SCR systems can include an ammonia oxidation catalyst (AMOX) (also known as an ammonia slip catalyst (ASC)) downstream—in the process flow direction—of the SCR catalyst.

ASCs for oxidizing excess ammonia in an exhaust gas are known. For example, U.S. Pat. No. 7,410,626 discloses a refractory oxide support such as gamma alumina upon which a platinum component is deposited and a vanadia component is deposited on the platinum. See also U.S. Pat. No. 5,679,313. WO 2008/106523 discloses a catalyst for oxidising ammonia comprising platinum, a second metal from one of the groups VB, VIB, VIIB, VIIIB, IB or IIB of the periodic table, a refractory metal oxide and a zeolite. US 2010/0166628 discloses a catalyst for removing nitrogen-containing pollutant gases from the exhaust gas of diesel engines, which contains a honeycomb body and a coating composed of two superposed catalytically active layers, wherein the lower layer applied directly to the honeycomb body contains an oxidation catalyst and the upper layer applied thereto contains one or more iron-exchanged zeolites, which have also a good SCR activity, as ammonia storage material, which has an ammonia storage capacity of at least 20 milliliters of ammonia per gram of catalyst material.

It is also known to combine SCR catalyst and ASCs on a single substrate: see e.g. WO2006/023932; WO2010/062730; US2010/0166628; and WO2011/041769.

Typically, commercial ASCs include precious metal components, especially platinum group metals. These and zeolite ASC components can be relatively expensive. It would be desirable, therefore, to use one or both of these components more efficiently for a net equivalent activity. Additionally, application of washcoats on honeycomb substrates to be disposed in an exhaust system, particularly multiple layered washcoat arrangements, can increase backpressure in the exhaust system and therefore the overall efficiency of the engine or power generation process. The present invention is intended to address one or more of these problems.

Applicant's International patent application no. PCT/GB2015/052161 filed on 24 Jul. 2015 is titled "Process for producing a catalyst and catalyst article".

According to the invention, there is provided a catalyst for oxidising ammonia comprising a selective catalytic reduction (SCR) catalyst and a composite heterogeneous extruded honeycomb having longitudinally extending parallel channels, which channels being defined in part by channel walls having a total longitudinal length, wherein the channel walls comprise a pore structure including a periodic arrangement of porous cells embedded in an inorganic matrix component, at least some of which porous cells are defined at least in part by an active interface layer of a catalytically active material comprising a precious metal supported on particles of a support material.

The composite extruded honeycomb is defined as having a "composite heterogeneous" structure because at least two phases are present. A first phase is the inorganic matrix component; and a second phase is provided by the active interface layer.

In the catalyst according to the invention, the support material for supporting the precious metal can comprise ceria, titania, a crystalline molecular sieve such as an aluminosilicate zeolite or a SAPO, alumina, zirconia, a mixed oxide of ceria and zirconia or a mixture of any two or more thereof.

The supported precious metal is preferably a platinum group metal, gold or silver and most preferably is platinum, palladium or both platinum and palladium. Where both platinum and palladium are present, each of the platinum and palladium can be supported on a separate and distinct support particle from the other. The support particle used for the platinum can be different from the support particle used for the palladium.

The present disclosure describes a process for making the composite heterogeneous extruded honeycomb. In this process, what are called functional particles are first provided, these being formed by a pore former as support, to which has been applied a layer of catalytically active material. The pore formers therefore have a dual function: on the one hand the formation of a pore structure; and on the other hand the structuring of the catalytically active material within the catalyst.

These functional particles are then processed with addition of further matrix-forming inorganic components, for example binder components, fillers, extrusion aids, inorganic fibres etc., in a manner known per se to give a catalytic composition, i.e. an extrudable mass. The extruded catalytic composition is finally subjected to a thermal treatment to form the catalyst, so as to form a ceramic body comprising a pore structure of catalytically active cells:

- which are formed by the pore formers in the functional particles;
- which are embedded in a matrix comprising the inorganic components;
- which form a porous structure; and
- which are at least partly surrounded by an active interface layer comprising the catalytically active material of the layer of the functional particles.

These porous cells are joined to one another to form the pore structure. The individual cells are formed by free spaces (pores) bounded at least in part by the active interface layer, or else partly filled by porous material. The at least porous cells are therefore cells partly filled with porous material, or pores, each bounded at least in part by the active interface layer. Accordingly, "pore structure" is understood to mean a cellular structure in which either pores or porous particle regions are joined together to form the cellular structure. This cellular structure is formed in part by the interface layer of the catalytically active material on its inner surface, i.e. the interface to the matrix, at least over broad areas.

The thermal treatment comprises, more particularly, a calcining and/or sintering operation as well, such that a cellular ceramic structure is formed overall. A cellular ceramic structure is understood to mean a 3-dimensional structure which is approximately network- or lattice-like, and in which the material bridges of the network or the lattice are ceramic, and enclose the at least porous cells between them. The individual particles of the active interface layer can be joined to one another, e.g. ceramically, i.e. through formation of sinter bridges.

It is therefore a feature of this catalyst that the walls that bound the porous cells comprise active interface layer of an (as far as possible) purely catalytically active material and that the internal surfaces defining the porous cells are defined as little as possible by the inorganic matrix component itself. The internal surface defining the porous cells in the final catalyst product are thus preferably free or at least substantially free of the inorganic matrix components. By "substantially free" herein, we mean that in a population of 100 porous cells, the mean internal surface coverage by catalytically active material (not including surface that is replaced by so-called "windows" or pores that connect cells (see below)) is 80% or more, preferably 85% or more and most preferably 90% or more. Alternatively, "at least substantially free of inorganic matrix components" is especially understood to mean that the matrix component content in the active layer is less than 10% of a hypothetical inorganic matrix component content that would be present in the case of a homogeneous distribution of the inorganic matrix components in the catalyst.

This distinguishes these active interface layers from washcoats, in which a high content of inorganic components as support material is present in a layer of catalytically active material. This is because, in catalytic washcoats, a catalyst composition comprising support material components is applied, and the support material components form, together with a supported catalytically active metal component after the sintering operation, a coating which is applied only externally to a surface of an inert substrate monolith e.g. honeycomb body. In contrast to washcoats, the catalytically active interface layers of the catalyst of the invention are therefore present within the volume of the catalyst and form in part the walls of the pore structure.

Basically, the active interface layer is free or substantially free of inorganic matrix components. In the production process, however, since the active layer forms an interface to the matrix consisting particularly, at least to a relevant degree, of inorganic matrix components, inorganic matrix components can also get into the layers, for example, because of the process parameters (pressure, temperature). Mixing of the components of the inorganic matrix component and of the catalytically active material resulting from the production process cannot be avoided, and so contamination with inorganic matrix components and/or with catalytically active material can occur in the matrix at the interface. The essentially matrix-free, active interface layer already achieves an improved catalytic activity, since a high density of catalytically active material is present in the near-surface region, which simultaneously has good accessibility to reactant gases at this boundary via the pore structure.

Figure 6:
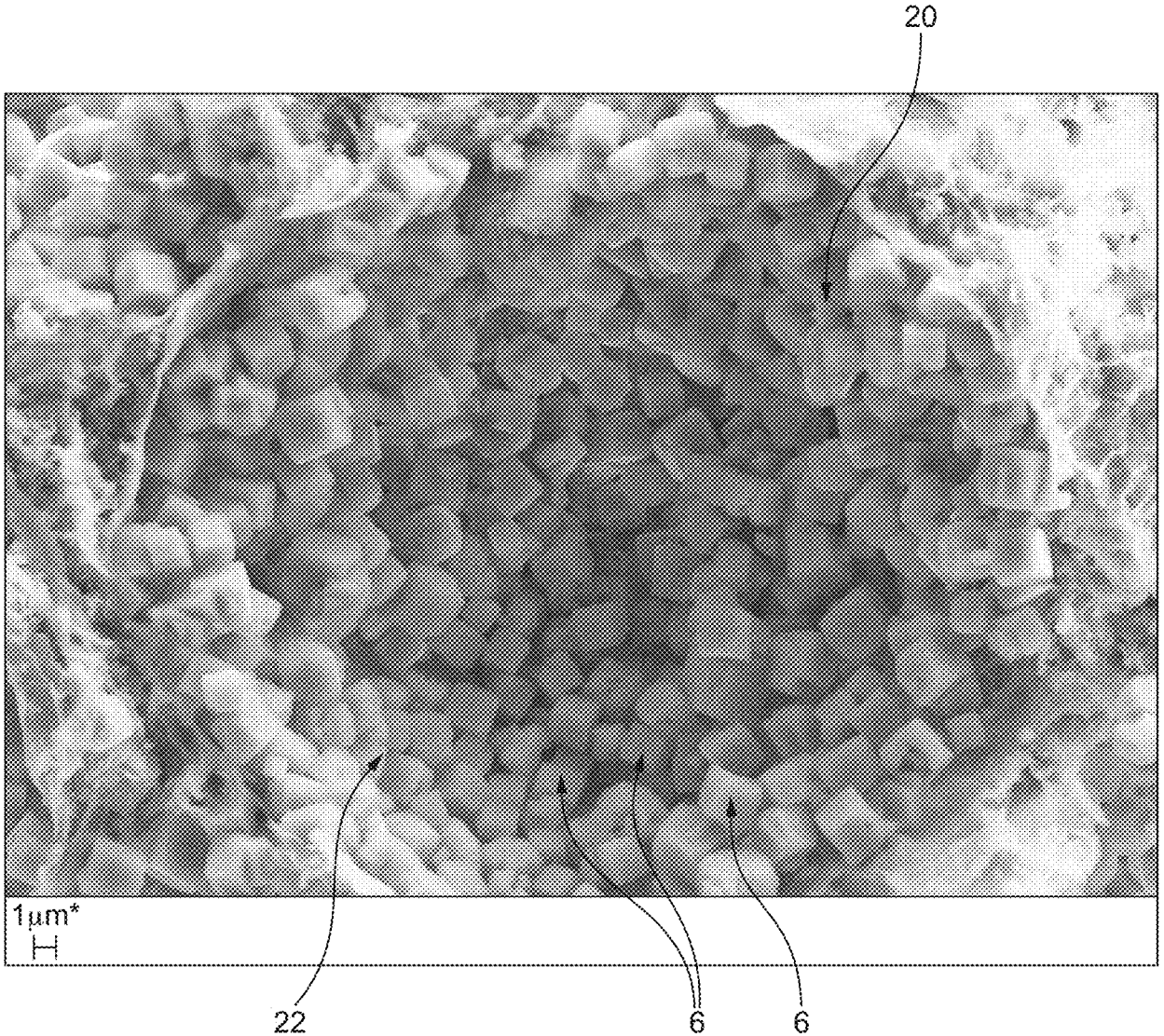

Moreover, the catalyst is characterized in that the catalytically active material is preferably joined ceramically in the active interface layer. The active interface layer comprises and preferably consists of ceramically bonded crystals of the support material joined to one another via sinter bridges. This is in addition to any bonding between active interface layer components and any inorganic pore formers (see below) or between the active interface layer components and the inorganic matrix components. The active interface layer is therefore not formed by chemical growth or deposition operations. So, for example, where the active interface layer comprises crystalline molecular sieves, e.g. zeolites, individual crystalline molecular sieves can be present as individual crystals (crystallites) and not as an intergrown layer, as is shown in FIG. 6 as reference numeral 6. Thus, the catalyst of the invention is distinguished from catalysts prepared by methods in which crystalline molecular sieves are grown on surfaces in situ, because such in situ grown crystalline molecular sieves are present as intergrowths and not as individual crystalline molecular sieves.

Therefore, according to the invention, individual particles of support material can be joined together in the active interface layer.

The specific production process therefore achieves a new class of catalyst having improved properties. At the same time, the production process is comparatively simple and can especially be integrated into conventional process technologies, especially for extruded catalysts. Through the choice of the functional particles, for example the size thereof, the geometry thereof and the proportion thereof, it is possible in a simple manner to adjust the pore structure within wide ranges.

Preferably, the pore formers are formed from an organic material, i.e. by organic particles. For the organic particles, preference is given to using conventional polymer materials, particularly thermoplastics, for example polystyrene, polyethylene or else cellulose, etc. In the course of thermal treatment, the organic particles escape (burn out), such that the cells take the form of pore cells, such that a pore structure with cells in the form of cavities, bounded by the active interface layer, is formed.

Alternatively, the pore formers can be formed from an inorganic porous material. Pore formers used are therefore inorganic particles. Porous material is understood more particularly to mean that these particles have at least mesoporosity and preferably macroporosity. According to the IUPAC (International Union of Pure and Applied Chemistry) definition, mesoporosity is generally understood to mean pores having a pore size of at least 2 nm to a maximum of 50 nm. Macroporosity covers pores having a pore size >50 nm. The expression "have at least mesoporosity" is therefore generally understood to mean that these particles have a porosity having pores >2 nm. The particles may at the same time also have macroporosity. This porosity with the comparatively large pores likewise effectively results in formation in the final catalyst—similarly to the case of the organic pore formers—of an interconnected porous structure through which the exhaust gas to be treated can be conducted into deeper layers of the catalyst volume, such that not only the near-surface layers at a channel wall surface are thus available for the catalytic action, especially in all-active extrudates.

The proportion of this inorganic porous material component can be within the range from 5 to 50% by weight, especially 10 to 25% by weight, based in each case on the total mass of the final catalyst. Therefore, a considerable proportion by mass is replaced by inorganic porous material component. It is possible here to use a plurality of different inorganic porous material components.

Inorganic porous materials used as pore formers can be clay materials, preferably a so-called pillared clay material. Such pillared clay materials are also known by the abbreviation PILC. These pillared clay materials generally feature two-dimensional clay layers spaced apart from one another. The spacing is effected by inorganic pillars consisting, for example, of titanium oxide or aluminium oxide.

Alternatively, preferably a diatomaceous earth is used as an inorganic pore former. Further alternatives used for the inorganic pore former are silica gel or else a porous glass.

To form the layer of the catalytically active material, preferably powder particles of the catalytically active material are applied to the particles of the pore former.

This involves fixing the powder particles, preferably by adhesion, to the particles of the pore former. Especially in the case of the inorganic pore formers, this is effected with the aid of an adhesion promoter or adhesive, for example an adhesive, with which, for example, the particles are wetted.

In the case of organic particles as pore formers, these are preferably heated, especially above the glass transition temperature thereof, but only to below the melting temperature thereof, such that they soften and the powder particles remain stuck to the surface after cooling. In this process, the use of an additional adhesion promoter in particular is dispensed with.

Finally, the powder particles can alternatively also be applied to the organic particles by electrostatic or chemical means.

The powder particles are preferably applied to the pore formers with the support of, or alternatively by, an additional force acting on the pore formers, for example by blowing them onto the organic particles, or by mixing, for example kneading, the pore formers together with the powder particles. Alternatively, the pore formers and the powder particles can be introduced together into a shaking apparatus.

As an alternative to the application of discrete powder particles to the particles of the pore formers, an outer layer of the initially catalytically inactive pore formers can be converted to the catalytically active layer, which forms the layer of the catalytically active material.

The inorganic pore formers in the final catalyst product can include a crystalline molecular sieve, e.g. a catalytically active zeolite structure, especially with retention of the mesoporous or macroporous particle shape thereof, at least at the outer layer thereof. Such zeolite structure can be formed from appropriate raw materials during the calcination or sintering process. The catalytic activity is achieved here especially through a metal ion exchange customary in the case of zeolites, especially Cu or Fe ions, or else through an additional metal ion intercalation. "Conversion" to the catalytically active layer is therefore understood to mean a chemical conversion with retention of the (meso- and macroscopic) morphology of the particles. The framework structure formed is the tetrahedral crystal structure typical of a zeolite, especially composed of $SiO_{4/2}$—$AlO_{4/2}$ tetrahedra. Overall, therefore, particles having a zeolitic framework structure or nanostructure are formed at the interface.

Conversion to a zeolite is known in principle. A prerequisite for this is that the particles consist of a silicon oxide-containing and/or aluminium oxide-containing material, which is then converted with addition of further components suitable for the structure formation under the influence of temperature and pressure to the desired zeolite microstructure in the course of a synthesis.

The conversion is effected here by means of a hydrothermal crystallization. In this conversion, the respective particle is generally used as a substrate for a supported crystallization. In the case of the preferred use of kieselguhr particles (diatomaceous earth), the amorphous $SiO_2$ present in these particles is used as a silicon source for zeolite formation. The particles are introduced here into an aqueous reaction mixture comprising further components, especially an aluminium source and typically an organic template or a plurality of organic templates. These further components therefore constitute reactants for the desired network formation. The conversion and transformation, and also microstructure formation, are then effected by hydrothermal crystallization at an elevated temperature of typically 80 to 200° C. and autogenous pressure with a reaction time of typically several days, for example one to ten days. Subsequently, the crystalline material thus obtained, after the hydrothermal treatment, is washed, dried and calcined at temperatures of 400 to 800° C. The calcination serves particularly to burn out the organic reactants (templates). The conversion is effected preferably only in near-surface regions, such that a zeolitic surface layer is formed.

The conversion is preferably effected as far as a zeolite having the MFI (e.g., ZSM-5), BEA (e.g., beta), CHA (chabazite, especially aluminosilicate chabazite), AEI (e.g. ALPO 18, but preferably aluminosilicate AEI), ERI (e.g. erionite) or FER (e.g. ferrierite) framework structure. The zeolites can be impregnated or exchanged with iron, copper or precious metals after the conversion, with copper preferred for SCR catalysts.

As an alternative to this chemical synthesis, the conversion can also be effected, for example, by the intercalation of catalytically active sites into near-surface regions of the particles. In the case of use of a pillared clay material (PILC), for example, catalytically active cells are intercalated between the clay layers into the free spaces formed by the inorganic pillars. For this purpose, any of iron, copper, manganese or else cerium is intercalated.

The catalytically active material for use in the active interface layer comprises a precious metal supported on particles of a support material and may also include a SCR catalyst. Preferably, the precious metal or SCR base metal promoter is pre-fixed on the particles of the support material prior to contacting the supported precious metal on the organic or inorganic pore formers. By "pre-fixed" herein, we mean that by techniques known in the art such as impregnation, deposition (or precipitation), co-deposition (or co-precipitation), electrostatic adsorption, ion exchange, solid state incorporation etc. a precious metal or a base metal is incorporated in the particulate support material followed as appropriate by washing, drying and calcining the product.

Alternatively, however, the support material can be processed as described herein to form an interface layer embedded in the matrix, following which the matrix is post-impregnated etc. with precious metal or base metal as appropriate to form the active interface layer.

In all cases, the powder particles form a layer surrounding the individual organic or inorganic particles, which is preferably substantially closed, such that the individual organic particles thus cover the surface of the powder particles to an extent of 60% to 95%. Complete coverage of the surface of the organic or inorganic particles is preferably not the aim; the coverage is therefore, for example, 90% of the surface area. This achieves, in a particularly advantageous manner, porosity of the active interface layer which forms after the sintering operation, such that accessibility to individual catalytically active sites within the catalytically active material is additionally improved, for example through the formation of windows or macro pores between adjoining cells. Alternatively or additionally, inorganic matrix particles can penetrate into the free regions, such that the subsequent sintering operation results in ceramic bonding to the powder particles.

In an appropriate manner, the functional particles have a particle size in the range from 10 μm to 200 μm. More particularly, the particle size is in the range of 30-50 μm. The particle size depends here on the specific application and especially on a wall thickness of the honeycomb. For wall thicknesses greater than 300 μm, preferably particle sizes in the range of 80-150 μm are used, and for wall thicknesses below 300 μm preferably particle sizes in the range of 30-70 μm. Through this particle size, it is possible to establish a desired, particularly suitable size of the catalytically inactive cells, especially the pores formed, in the final catalyst. The cells likewise have at least a similar size to the original pore formers, i.e. either the organic or inorganic particles.

The size and shape of the porous cells is dictated by the size and shape of the pore formers and can be spherical, spheroid, ovoid, ellipsoid, cuboid, tunnel-state (cylinder, prismatic column), slit etc.

To produce the catalytic composition further components which later form part of the inorganic matrix component are preferably added. More particularly, inorganic, catalytically inactive components can be added as matrix forming components, these forming a ceramic support structure or matrix after the sintering operation, and ensuring the necessary mechanical stability, especially in the case of use of zeolites as catalytically active material. Such mechanical stability can also be improved with the addition of inorganic, e.g. glass, fibres.

A shaped body is preferably formed from the catalytic composition, especially by extrusion, and this is subsequently subjected to the thermal treatment. The catalytic composition therefore becomes a solid all-active body, especially an all-active honeycomb extrudate, in which individual walls are thus formed completely from the catalytic composition. This catalytic composition is especially a malleable, preferably extrudable, composition.

The specific production process additionally forms, on the side of the catalytically active interface layers facing away from the cells, a matrix which forms a mechanically stable support structure. Overall, this gives the catalyst a sufficiently high mechanical stiffness and especially strength. Therefore, for the active interface layers, it is also possible to employ materials which cannot be sintered or can be sintered only poorly to give a solid body.

The catalytic composition is preferably produced with the aid of a mixing unit, especially a kneader, with mixing of the individual constituents and components with one another.

Preferably—especially where organic particles are used as pore formers—in a single process step, the powder particles are first applied to the organic particles and then the individual components of the catalyst composition are mixed. This is appropriately accompanied by the simultaneous formation of the shaped body from this catalytic composition in this step as well. For this purpose, for example, a (twin-screw) extruder is supplied in an upstream region with the organic particles together with the powder particles, before the further components for formation of the catalytic composition are then added. Finally, at the end of the extruder, the shaped body is formed by extrusion.

The proportion of the pore formers and hence approximately also of the functional particles is preferably within a range from 40% by volume to 80% by volume, based on the total volume of the individual components of the catalytic composition in the dry, pulverulent starting state of the catalytic composition, i.e. before water or other liquids are added for production of a suspension or of the pasty composition. By virtue of this comparatively high proportion of pore formers, a high-porosity structure is produced with the desired properties of high accessibility to the catalytically active interface layers. The proportion of the pore formers is especially such that formation of the desired cellular open-pore ceramic structure in the subsequent sintering step is assured, with the individual active interface layers of the individual at least porous cells joined to one another. The pore formers therefore have to be adjacent to one another, such that they are joined to one another via their catalytically active layers that form the active interface layers at a later stage.

Accordingly, a pore volume formed by the pores is preferably in the range between 40% by volume and 80% by volume, based on the total volume of the catalyst. The remaining bulk volume is divided between the catalytically active interface layers and the mechanical support structure and matrix formed by the matrix component. The catalytically active interface layers account for about 20% by volume to 80% by volume, based on the bulk volume remaining.

It is a significant advantage of the present invention that the interconnectivity between porous cells can be adjusted by the quantity of functional particles added to an extrudable catalyst composition, wherein when a relatively high quantity of functional particles are used, adjacent pore formers can touch during an extrusion process. Following calcination, where adjacent functional particles have touched, windows between pores can form between cells defining macropores, thus improving interconnectivity of a pore network. In order to assure this, the catalyst composition is appropriately also pressurized during the production of the shaped body, especially by the extrusion, in order thus to achieve intimate contact between the functional particles.

However, where relatively few functional particles are included in the formation of a catalyst composition, there is a lower possibility for contact between functional particles during an extrusion process and hence individual cells can have a relatively high percentage of active interface layer. Hence it is possible to adjust the porosity and interconnectivity on the one hand with the quantity of catalytically active material per porous cell on the other hand when preparing the catalyst composition by appropriate selection of a quantity of functional particles to use.

Therefore, the porous cells in the periodic arrangement of the catalyst according to the invention can be interconnected by windows between cells, which windows defining macro pores; or the porous cells in the periodic arrangement can be substantially not interconnected by windows between cells.

The porosity of the composite heterogeneous extruded honeycomb in the catalyst according to the invention can be from 40 to 80%, preferably >50% such as 55-70%. The porosity can be adjusted inter alia by selecting the appropriate quantity of functional particles for preparing the extrudable catalyst composition—and therefore the concentration of porous cells per unit volume; and the size of the pore formers.

Preferably, the individual active interface layers can be joined to one another to form a cellular ceramic and open-pore structure. The individual cells and active interface layers enclosing them are therefore not arranged in an isolated manner, but form a coherent structure. A cellular structure is generally understood to mean a material structure in which a multitude of individual cavities or high-porosity material regions—formed by the pore formers—are joined to one another by means of cell walls. The cell walls are formed by the interface layers joined to one another.

These active interface layers are preferably porous and not entirely impervious, such that good mass transfer is assured for the intended catalytic reaction overall.

The matrix can be at least substantially free of catalytically active material, in which case the catalytic activity can be provided preferably exclusively or almost exclusively by the interface layers of the catalytically active material. Only through contamination effects can catalytically active material pass from the catalytically active interface layers into the matrix which otherwise takes the form of a pure matrix. "At least substantially free of catalytically active material" is therefore understood to mean that catalytically active components are incorporated into the matrix in the interface to the catalytically active interface layer, if at all. The proportion of the catalytically active components in the matrix is especially below 10% of the proportion in the case of a hypothetical homogeneous distribution of the active components within the overall catalyst.

However, in addition to the active interface layers, catalytically active material can also be present in the matrix. For this purpose, additional catalytically active material is added to the catalyst composition in the course of production. This additionally catalytically active material preferably differs from the material present in the active interface layer. Catalytically active material present in the matrix component can be a pillared clay. In a preferred configuration, the at least one porous filler component is a clay material. It is appropriate here to use a pillared clay material (PILC). This clay material generally has two-dimensional clay layers spaced apart by inorganic pillars. The pillars consist, for example, of titanium oxide or aluminium oxide.

Advantageously, it is also possible to use different size distributions for the particles of the pore former so that the resulting cells/pores are of different size classes.

In addition, preferably the cells having the active interface layers form different reactive sites in different configurations. For this purpose, the active interface layers of the various cells can be different. The active interface layers of different cells can be formed from different catalytically active materials, i.e. the catalytically active material of a first interface layer of a first cell is different from that of a second interface layer of a second cell. Alternatively or additionally, different active materials are present within an interface layer which bounds a particular cell, i.e. an active interface layer of a particular cell contains two or more different catalytically active materials.

Therefore, according to the present invention, preferably the active interface layer of catalytically active material in at least some of a population of the porous cells embedded in the matrix comprises a mixture of SCR catalyst and precious metal supported on a support material and/or in a population of porous cells embedded in the matrix, the active interface layer of catalytically active material in a first fraction of the population is precious metal supported on a support material and the active interface layer of catalytically active material in a second fraction of the population is SCR catalyst.

The layer thickness of the active interface layer is preferably in the range from 0.5 to 20 μm and especially in the range from 1 μm to 10 μm. The layer thickness is generally within the region of the particle size of the functional particles, which is indeed preferably within the ranges mentioned.

Preferably in arrangements wherein (a) the active interface layer of catalytically active material in at least some of a population of the porous cells embedded in the matrix comprises a mixture of SCR catalyst and precious metal supported on a support material and/or (b) in a population of porous cells embedded in the matrix, the active interface layer of catalytically active material in a first fraction of the population is precious metal supported on a support material and the active interface layer of catalytically active material in a second fraction of the population is SCR catalyst, preferably (a), the precious metal is supported on a particulate siliceous support comprising a silica or a zeolite with a crystalline molecular sieve having a silica-to-alumina ratio of ≥100, preferably ≥200, more preferably ≥250, even more preferably ≥300, especially ≥400, more especially ≥500, even more especially ≥750 and more preferably ≥1000.

The weight ratio of the amount of the SCR catalyst to the amount of precious metal on a support with low ammonia storage can be in the range of 0.1 to 300:1 inclusive, preferably from 3:1 to 300:1 inclusive, more preferably 7:1 to 100:1 inclusive, and even more preferably in the range of 10:1 to 50:1 inclusive.

The precious metal can be present in the catalyst in an active component loading from about 0.01 to about 0.3 wt. % inclusive preferably from about 0.03 to 0.2 wt. % inclusive, more preferably from about 0.05 to 0.017 wt. % inclusive and most preferably from about 0.07 to 0.15 wt. % inclusive. The term "active component loading" refers to the weight of the precious metal support+the weight of the precious metal+the weight of the SCR catalyst in the active interface layer of a population of porous cells embedded in the matrix.

The particulate siliceous support comprising a silica or a zeolite with a crystalline molecular sieve having a silica-to-alumina ratio of ≥100 has relatively low ammonia storage and it has been found that in combination with SCR catalysts, particularly with Cu- and/or Fe-crystalline molecular sieve SCR catalysts, is that the ASC (or AMOX) catalyst as a whole can provide an improvement in $N_2$ yield (i.e. increased selectivity) from ammonia at a temperature from about 250° C. to about 350° C. compared to a catalyst comprising a comparable formulation in which the SCR catalyst is present as an upper layer and the supported precious metal is in a layer that stores ammonia and is present in an underlayer, wherein the $NH_3$ passes through the SCR catalyst layer before contacting the supported precious metal layer.

Either in the alternative or additionally, the extruded catalyst article can be coated with a washcoat, either a washcoat comprising the catalyst as described here or a different washcoat comprising another catalyst, i.e. a catalytically active material different from the catalytic composition. Thus, a catalytically active coating can be additionally applied by means of the washcoat. A washcoat is generally understood to mean a suspension comprising matrix components as well as catalytically active components. The washcoat is applied, for example, by dipping the catalyst into the suspension and then treating it thermally. However, in applications that are sensitive to increased backpressure, embodiments including an additional washcoat layer that reduces an open frontal area of the honeycomb, washcoated arrangements are less preferred.

Where the catalyst combines (a) or (b), wherein (a) and (b) comprise a first SCR catalyst, such as a Cu- or Fe-crystalline molecular sieve in the honeycomb, a washcoat comprising a second SCR catalyst can be coated on at least part of a total length of the channel walls of the honeycomb. Applicant has found that such an arrangement can also improve $N_2$ selectivity and favourably reduce $N_2O$ generation.

Therefore, according to the invention, the SCR catalyst can be provided in a washcoat coated on at least part of a total length of the channel walls.

The catalyst according to the invention comprises a composite heterogeneous extruded honeycomb. The honeycomb body can be coated with a catalytically active coating which is either identical to or different from that present in the extruded body. A coating of this kind has been applied, for example, as a washcoat, as disclosed by DE 10 2012 213 639 A1. More particularly, the honeycomb can comprise an extruded SCR catalyst. Alternatively, no coating is applied.

The catalyst according to the invention comprises a SCR catalyst, either as a component of an active interface layer or a washcoat applied on the honeycomb or both.

The SCR catalyst comprises preferably a crystalline molecular sieve promoted with a base metal or a vanadium compound supported a support comprising titanium.

Where the SCR catalyst is a vanadium compound supported on a support comprising titanium, different titanium-vanadium systems can be used. More particularly, oxidic systems comprising mixtures of titanium dioxide ($TiO_2$) and vanadium pentoxide ($V_2O_5$) are used. Alternatively, the titanium-vanadium system comprises vanadium-iron compounds as the catalytically active component, including especially iron vanadate ($FeVO_4$) and/or iron aluminium vanadate ($Fe_{0.8}Al_{0.2}VO_4$).

In the case of the oxidic systems, these are especially titanium-vanadium-tungsten systems, titanium-vanadium-tungsten-silicon systems, titanium-vanadium-silicon systems. In the case of the second group comprising vanadium-iron compounds, these are titanium-vanadium-tungsten-iron systems, titanium-vanadium-tungsten-silicon-iron systems or titanium-vanadium-silicon-iron systems.

The titanium/vanadium weight ratio (Ti/V) is appropriately in the range between 35 and 90. In the case of oxidic titanium-vanadium systems, the weight ratio between titanium dioxide and vanadium pentoxide ($TiO_2/V_2O_5$) is typically in the range from 20 to 60.

The titanium-vanadium system typically has a proportion by weight of 70 to 90% by weight, based on the final catalytic converter. The remaining 10 to 30% by weight is divided between the porous inorganic filler component and matrix components, and possibly fibre components.

"Crystalline molecular sieve" is understood here to mean particularly zeolites in the narrower sense, namely crystalline aluminosilicates. Furthermore, crystalline molecular sieves are also understood to mean further molecular sieves which are not aluminosilicates but have a zeolitic framework structure, as apparent from the zeolite atlas of the Structure Commission of the International Zeolite Association, IZA-Sc. More particularly, this relates to silicoaluminophosphates (SAPO) or else aluminophosphates (ALPO), which are likewise included in the zeolite atlas mentioned.

Catalytically active components used in this context are especially molecular sieves having the CHA framework structure, especially aluminosilicate CHA such as SSZ-13, or SAPO-34, AEI, especially aluminosilicate AEI, SSZ-39 or ALPO 18, ERI, MFI, BEA, FAU especially Y zeolite, AFX or FER (the nomenclature used here refers back to the nomenclature used in the zeolite atlas). Most preferred are so-called small pore crystalline molecular sieves, such as CHA, AFX and AEI framework structures, having a maximum pore opening structure of 8 tetrahedral atoms. Preferably, aluminosilicates are used as molecular sieves, especially for extruded catalysts, since the network structures show no change in the lattice spacings on water uptake and water release. (The nomenclature used here draws on the nomenclature used in the Zeolite Atlas).

In the case of the crystalline molecular sieves having the framework structures according to the zeolite atlas, a distinction is generally made between small-pore, medium-pore and large-pore crystalline molecular sieves. Small-pore molecular sieves are those sieves having a maximum pore opening with a ring structure composed of eight tetrahedral atom structures. Medium-pore and large-pore molecular sieves, finally, are understood to mean those in which the maximum pore openings are formed by a ring opening having a ring of not more than 10 (medium-pore) or of not more than 12 (large-pore) atom structures in tetrahedral arrangement. The BEA framework structure mentioned is a large-pore framework structure, MFI is a medium-pore structure and CHA is a small-pore structure. The FAU framework structure mentioned is likewise a large-pore structure, preferably a Y zeolite. AEI is a mall-pore-framework structure, and preference is given here to using a zeolite with the SSZ-39 designation. FER in a medium-pore framework structure, and the material used is preferably ferrierite or ZSM-35. ERI is a small-pore structure, and the material used is preferably erionite. AFX is a small-pore framework structure, and the material used is preferably SSZ-16. The BEA, MFI and FAU framework structures (here especially zeolite Y) are preferably used as hydrocarbon traps. All the framework structures and materials mentioned can be used as SCR catalytic converters; they are suitably activated by a metal, especially ion-exchanged with copper and/or iron and/or cerium, preferably activated with copper or iron.

The molecular sieve generally comprises a metallic activator (promoter). This is especially copper, iron or cerium or a mixture thereof. More particularly, the molecular sieve is a molecular sieve, especially zeolite, exchanged with metal ions of this kind. As an alternative to the ion-exchanged molecular sieve in which the metal ions are thus incorporated into the framework structure, it is also possible that these metal activators are not incorporated in the framework structure and are thus present effectively as "free" metals or metal compounds (e.g. metal oxides) in the individual channels of the molecular sieves, for example as a result of impregnation of the molecular sieve with a solution containing the compound. Another possibility is a combination of ion-exchanged metals and free metal compounds in the molecular sieve.

Highly preferred crystalline molecular sieves are those having—in addition to their inherent microporous structure—at least mesoporosity as a secondary pore system, as defined by the IUPAC definition discussed hereinabove. Most preferably, such crystalline molecular sieves having at least mesoporosity as a secondary pore system are present as single crystals (crystallites). Methods of making crystalline molecular sieves having at least mesoporosity as a secondary pore system include alkaline treatment and are discussed in the Review Article D. P. Serrano et al, Chem. Soc. Rev., 2013, 42, 4004.

Aside from the preferred base metal promoter/crystalline molecular sieve and vanadium compound/titanium compound SCR catalysts, SCR catalysts for use in the present invention can be based on a tungsten oxide-cerium oxide system or a stabilized tungsten oxide-cerium oxide system ($WO_3/CeO_2$).

The stabilized tungsten/cerium system is especially a zirconium-stabilized system comprising Ce-zirconium mixed oxides. Preferably, a transition metal, especially iron, is distributed within such a support material. The transition metals used are especially selected from the group consisting of Cr, Ce, Mn, Fe, Co, Ni, W and Cu and especially selected from the group consisting of Fe, W, Ce and Cu.

Figure 3:
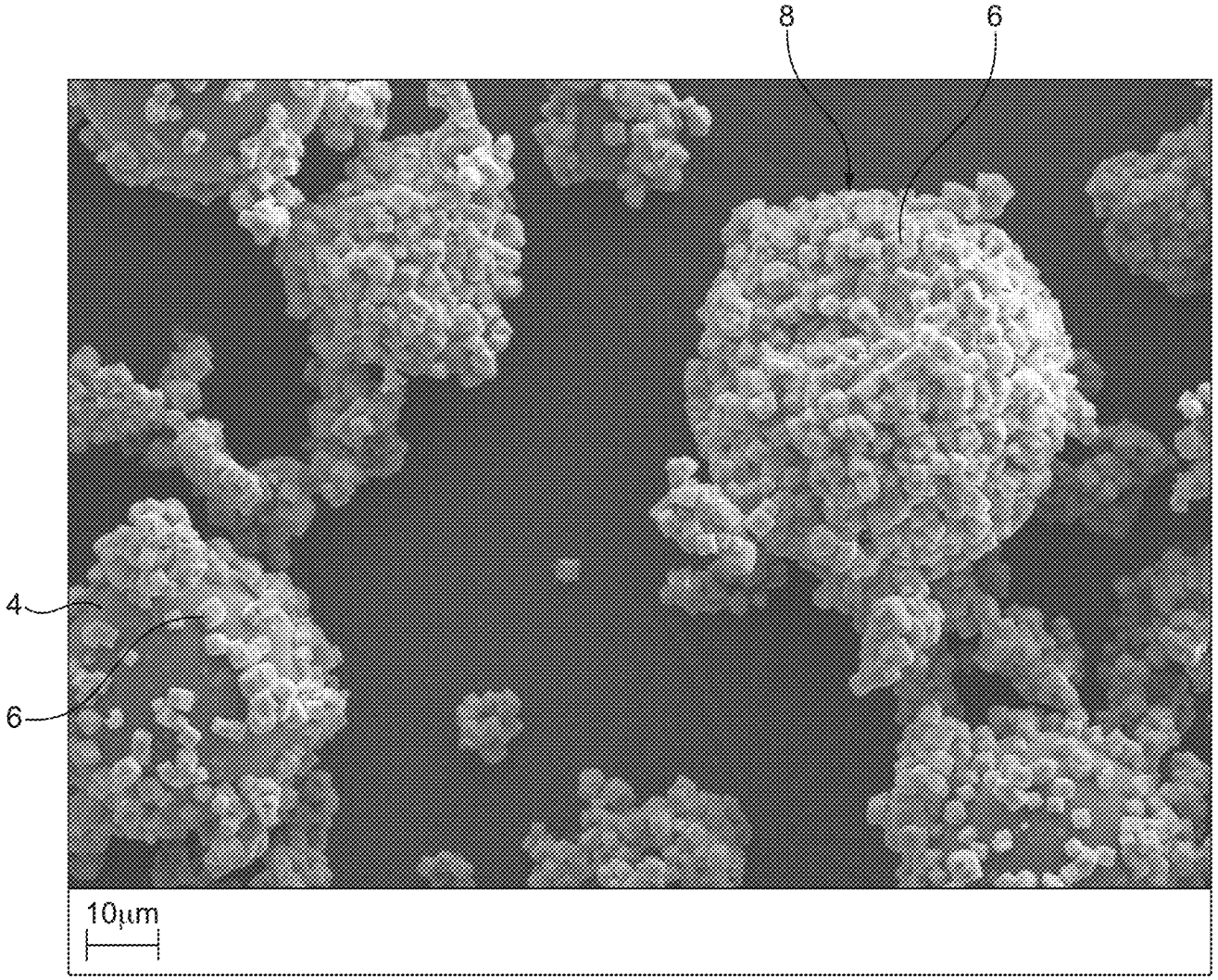

The catalytic system is especially an Fe—$W/CeO_2$ or Fe—$W/CeZrO_2$ system, as described particularly in connection with FIG. 3 of WO 2009/001131, which is referenced here in full. The proportion of the transition metal in the catalytic converter is preferably in the range from 0.5 to 20% by weight based on the total weight of the catalytic converter.

The different catalytic systems described here are used either selectively or else in combination. More particularly, a mixture of the system based on titanium-vanadium with crystalline molecular sieves is used. A mixed catalytic converter of this kind comprises, as the first component, especially an aluminosilicate or iron silicate molecular sieve, which is either in the so-called $H^+$ form or has been ion-exchanged with one or more transition metals, especially with iron. The second component is a vanadium oxide on a metal oxide support selected from aluminium, titanium, zirconium, cerium, silicon or combinations thereof. More particularly, the support material for the second component is titanium oxide. The first component is especially an iron-exchanged MFI, BEA or FER aluminosilicate molecular sieve (zeolite). The ratio of the first component to the second component in this mixture is in the range from 5:95 to about 40:60.

In contrast to the catalytically active component, the porous filler is preferably catalytically inactive, and therefore serves purely as a porous filler material.

By virtue of the specific production process with the functional particles, various possible designs matched to the particular application are generally available for the catalyst. For instance, preferably different particles for the pore formers which differ in terms of their particle size distribution can be used. Through this measure, it is therefore possible to set different cell sizes (pore sizes) in a controlled manner within the open-pore structure that will form at a later stage, in order, for example, to pass the exhaust gas to be treated effectively to the catalytically active sites.

In addition, in a preferred configuration, two or more different functional particles, especially different catalytically active powder particles, are used for the formation of the catalytically active layer and hence also for the catalytic composition. A mixture of two or more catalytically active materials, especially powder particles, can be used for a particular layer. As a result, a catalytically active interface layer of an individual cell will have different catalytically active materials at a later stage. Additionally or alternatively, different catalytically active material, especially powder particles, can be applied to the individual pore formers, such that different kinds of functional particles, which differ in terms of their catalytic activity, are thus provided. Therefore, a first catalytically active material is applied to first pore formers and a second catalytically active material to second pore formers, in order to form first and second functional particles. The first and second pore formers may be identical or else different here in terms of their physical composition.

In the final catalyst, the effect of this is that the catalytically active interface layers in various cells are formed from different catalytically active materials and/or different catalytically active materials are present within a catalytically active interface layer which bounds a particular cell. The different catalytically active materials, i.e. the different powder particles, are appropriately catalytically active materials optimized for different catalytic reactions. Through this measure, catalytically different reaction sites are therefore provided in immediate proximity at the local microstructural level. Effectively, microreactors are therefore provided. The catalytically active materials used are especially matched to one another in such a way that they are optimized, for example, for two successive chemical reactions. The different microreactors therefore form a kind of cascade in relation to the desired catalytic reactions. For example, in the SCR system, a first catalytically active material may be configured for a decomposition of $N_2O$, in order to obtain lower $N_2O$ slippage. Alternatively, a microreactor class may also be designed for formation of $NO_2$. The provision of a suitable "microreactor configuration" composed of different microreactors achieves an effective reduction in $NO_x$ levels.

According to the preceding description, the SCR catalyst for use in the present invention can be is a crystalline molecular sieve supporting a base metal promoter or vanadia supported on a titania support; the crystalline molecular sieve can be an aluminosilicate zeolite and the supported base metal promoter is copper, iron or both copper and iron; and the aluminosilicate zeolite can have the MFI, BEA, CHA, AEI, FAU, AFX or ERI framework structure.

The catalyst according to the invention comprises an inorganic matrix component, which can be an alumina phase, a silicate phase, an inorganic fibre phase or a combination of any two or more thereof. In particular, the silicate phase can comprise a pillared clay and/or a diatomaceous earth.

The inorganic matrix component in the catalyst according to the present invention can comprise 5 to 50% by weight of the catalyst.

The composite heterogeneous extruded honeycomb having longitudinally extending parallel channels according to the invention can have channels which are open at both ends. In this form, the structure is known in the art as a flow-through monolith.

However, in an alternative arrangement, the composite heterogeneous extruded honeycomb having longitudinally extending parallel channels takes the form of what is called a wall-flow filter, in which the exhaust gas flows through porous walls in operation. In a wall-flow filter according to the invention, in an array of first channels, each first channel in the array is bordered on its sides by a second channel and the first channels are end-plugged at a first end of the honeycomb and the second channels are end plugged at a second end of the channels. The composite heterogeneous extruded honeycomb described here is particularly well suited for use in a wall-flow filter arrangement because of the in-built porosity of the honeycomb and highly accessible catalytically active material. This provides a beneficial combination of catalyst activity and reduced backpressure when in use.

According to a second aspect, the invention provides an exhaust system for an electrical power station, an internal combustion engine or a nitric acid plant, which system comprising an inlet end and an outlet end and a device for introducing ammonia or a precursor of ammonia into an exhaust gas flowing in the exhaust system in the direction of the inlet end from the outlet end, wherein a catalyst according to any preceding claim is located downstream of the device for introducing ammonia or a precursor of ammonia into an exhaust gas flowing in the exhaust system. A substrate monolith comprising a SCR catalyst can be disposed between the device for introducing ammonia or a precursor of ammonia into an exhaust gas flowing in the exhaust system and the catalyst according to the invention.

According to a third aspect, the invention provides a vehicle, such as an automobile, a train, a ship etc., comprising an internal combustion engine and an exhaust system according to the second aspect of the invention.

Figure 2:
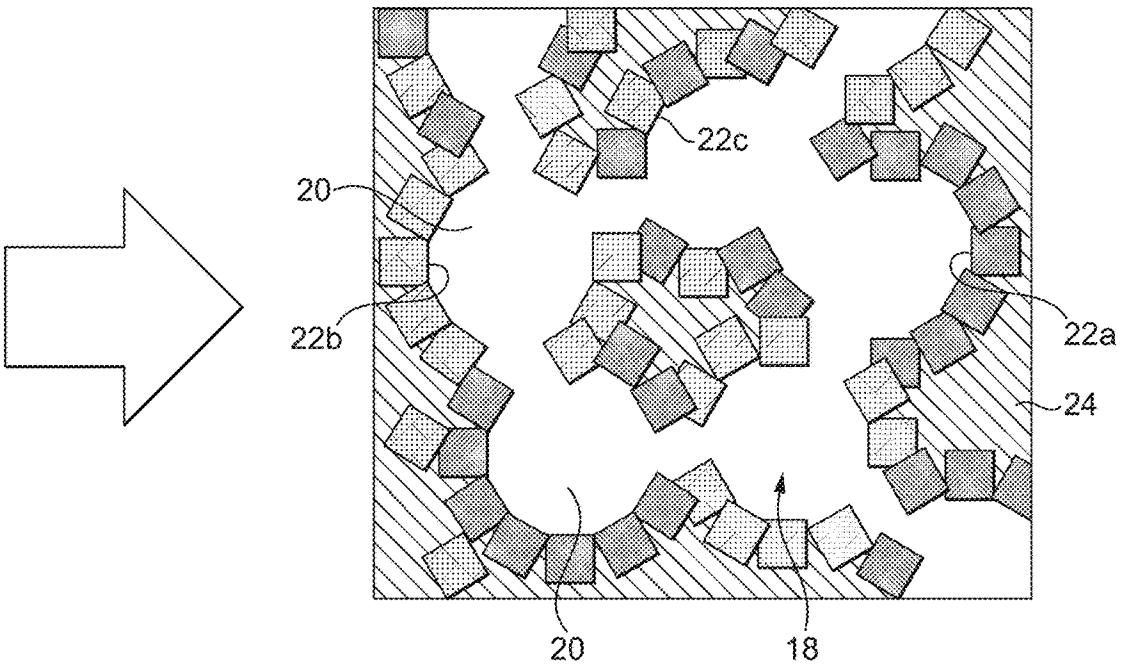
Figure 4:
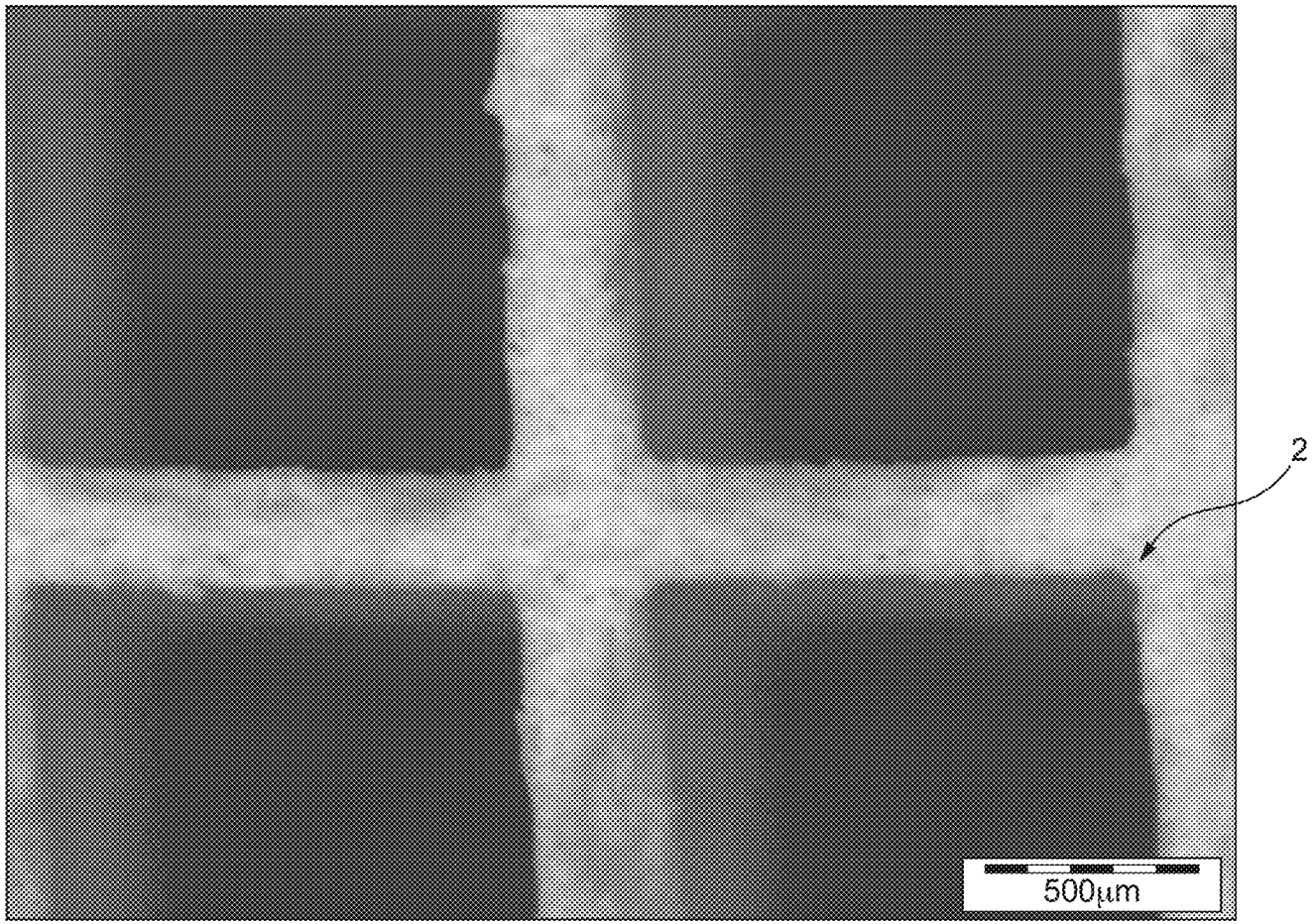
Figure 5:
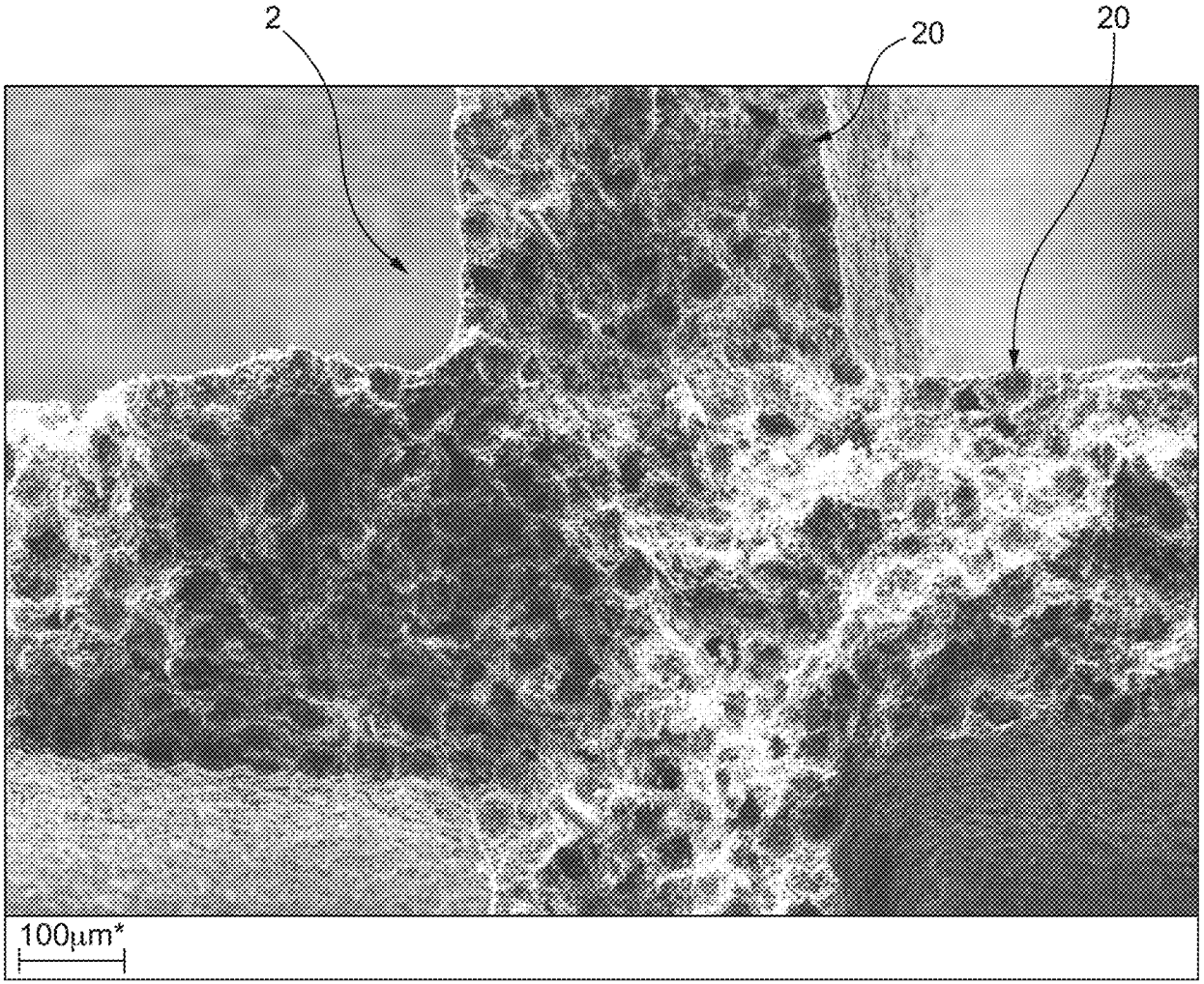

In order that the invention may be more fully understood, the following explanations are provided with reference to the accompanying Figures, wherein:

FIG. 1 a schematic diagram of the production process of a catalyst,

FIG. 2 a simplified schematic diagram for illustration of the use of different functional particles, FIG. 3 an SEM image of the functional particles, FIG. 4 a detail from an image of an extruded honeycomb catalyst, FIGS. 5 and 6 the honeycomb catalyst shown in FIG. 4 at different enlargements.

With reference to FIG. 1, the production of a catalyst 2 and of a catalyst article 14 formed by the catalyst 2 is elucidated hereinafter. The catalyst article 14 is an extruded honeycomb catalyst. The principles of the process can generally be applied to a wide variety of different catalysts which differ both in terms of their structure and in terms of the catalytically active materials used therein.

In the embodiment shown in FIG. 1, in a first step, as pore formers, organic particles 4 and powder particles 6 of a catalytically active material are provided. This catalytically active material is especially a zeolite, preferably an ion-exchanged zeolite, more particularly a copper ion-exchanged zeolite. The individual powder particles typically have a particle size in the range of 1-10 μm. The organic particles 4 are polymer particles, especially spherical particles or the like, consisting, for example, of polyethylene or other thermoplastics or elastomers.

In the next step, functional particles 8 are produced from these two starting materials. For this purpose, the organic particles 4 and the powder particles 6 are mixed with one another and preferably heated to above the glass point of the organic particles 4, such that they soften. As a result, the powder particles 6 stick to the surface of the organic particles 4 after cooling and form an at least substantially continuous powder layer on the surface of the particles 4, which forms a layer 5 around the particles 4.

As an alternative to the functional particles 8 described here, having the organic particles 4 as pore formers, it is also possible to use inorganic, porous particles as pore formers. In the case of these too, in a first variant, the layer 5 is formed by applied powder particles 6. Alternatively, the layer 5 of catalytically active material can also be formed by a catalytic activation of the surface of the particles 4.

In all cases, the layer 5 is in at least substantially closed form and has a coverage level of the particle 4 preferably in the range from 60% to 95%.

In the next step, the functional particles 8 are mixed with an inorganic matrix-forming component, especially a matrix component 10, for formation of a catalytic composition 12. This is effected, for example, by a kneading operation or another mixing operation, especially with thermal action. Inorganic matrix-forming components used here are inorganic binders as generally employed for the formation of extrudable catalytic compositions 12. Suitable inorganic matrix-forming components 10 are especially clays, for example bentonite, refractory clay, kaolin, or else metal oxides such as aluminium oxide, cerium oxide, or else sols based on aluminium oxide, silicon oxide or titanium oxide. These matrix components 10 may be supplemented, if required, with further organic sintering aids or else support elements, for example inorganic fibres, e.g. glass fibres. The proportion of these additional matrix components 10 is, for example, within the range from 25 to 35% by volume. The remaining 65-75% by volume of the catalytic composition 12 (based on the dry state, without addition of liquids) are therefore formed by the functional particles 8. In addition to these constituents, organic extruding aids may also be added.

As already mentioned, the catalytic converter further comprises, in addition to the porous filler component, a matrix component, supplemented, in an appropriate configuration, also by a fibre component in the case of an extrusion material. The proportion of the matrix component and of the fibres is preferably in the region of a few % by weight in each case, for example in the range from 4 to 10% by weight.

The organic particles 4 have a particle size typically in the range from about 10 to a maximum of 200 μm and preferably from 10 to a maximum of 100 μm.

The catalytic composition 12 produced in this way is subsequently extruded to form a honeycomb shaped body 14. In the course of extrusion, a pressure is applied to the catalytic composition 12. This presses the individual functional particles 8 against one another, such that they are in mutual contact with their powder particles 6. After the extrusion, as usual, the shaped body 14 is dried, calcined and subsequently sintered, so as to obtain the final catalyst 2 and hence also the catalyst article 14 in the form of the honeycomb catalyst.

This is shown in FIG. 1, merely in the form of a schematized structure. As can be inferred from this, the catalyst 2 has an open-pore pore structure 18 consisting of several cells joined to one another, which are formed when organic pore formers are used as pores 20. The individual pores 20 are bounded in each case by an active interface layer 22 which forms the cell wall. This active interface layer 22 is formed by the powder particles 6, which are now sintered to one another, i.e. the catalytically active material. These active interface layers 22 are therefore at least substantially free of the matrix component 10. The side of the active interface layer 22 facing away from the pores 20 adjoins the matrix material, which thus forms a matrix 24 as support structure and matrix. The pore structure 18 has therefore been formed within the matrix 24, with each of the pore walls formed by the active interface layers 22. The connection of the individual pores 20 to one another is formed in the extrusion and the sintering operation and is favoured by the close proximity of the individual functional particles 8 in the catalytic composition 12. It is particularly advantageous in this context that the catalytic composition 12 is produced by the kneading or subsequent extrusion, in which high compressive forces are exerted. Overall, an open porous cellular wall structure has therefore been formed.

The process has been elucidated in the context of FIG. 1 with reference to the use of a zeolite as catalytically active material. The process concept described here, however, is not restricted to the use of a zeolite. The basic process steps and stated parameters can also be applied to other catalytically active materials. The functional particles 8 produced at the intermediate stage can additionally also be employed for other production processes, for example for formation of a suspension which is then applied to a support body which has been extruded, for example, for formation of a washcoat.

Through the provision of the functional particles 8, various adjustments in the properties of the catalyst 2 are possible in a simple manner. One way of doing this is illustrated in detail by FIG. 2. This shows, in schematic form, three kinds of functional particles 8 which differ with regard to the coating thereof with the powder particles 6. Thus, one kind of functional particles 8 has been configured with a first kind of powder particles 6a, a second kind with a second kind of powder particles 6b, and a third kind of functional particles 8 with a mixture of these two powder particles 6a, 6b. In the final catalyst 2, the effect of this is that the pores 20 are bounded by different active interface layers 22a, 22b, 22c. In one case, the pores 20 are thus bounded by the first catalytic composition of the powder particles 6a/the second catalytic composition as per the powder particles 6b or else by a catalytic composition formed from the mixture of these two powder particles 6a, 6b. In this way, different catalytic sites are provided in the immediate surroundings.

The SEM image in FIG. 3 once again shows the actual features of the functional particles 8. Clearly apparent here are the individual powder particles 6 which have been applied to the surface of the organic particles 4 and form a more or less continuous layer. Uncovered surface regions are fundamentally desirable for achieving a certain porosity of the active interface layer 22 ultimately formed. In addition, this promotes the formation of the open-pore cellular structure. The individual powder particles 6 are deposited on the surface of the organic particles 4 preferably in one layer or in a few layers. There is isolated formation of agglomerates.

FIG. 4 shows an image of a detail of an extruded honeycomb catalyst 2, here with rectangular flow channels through which the exhaust gas flows in operation. The catalyst 2 thus takes the form of an all-active extrudate in which the individual walls that bound the individual flow channels are formed from the catalytic composition 12.

In FIGS. 5 and 6, the (coarse) pore structure that forms is clearly apparent. In addition, it is also possible to see, in the images shown here, how the individual pores 20 are at least partly joined directly to one another, such that an open pore structure is formed overall. Also clearly apparent are the porous active interface layers 22, which are formed by the individual powder particles 6, now ceramically joined to one another.

Reduction in nitrogen oxide levels in exhaust gases both from stationary e.g. electrical power station and from mobile combustion systems, especially in motor vehicles, is accomplished using the known method of selective catalytic reduction (SCR). This involves reducing nitrogen oxides in the presence of ammonia and oxygen to nitrogen. Various catalytic converter types and systems are known in principle for the acceleration of this reaction. An established class of catalytic converter is based on a titanium-vanadium catalytic converter system. Titanium-vanadium catalytic converters of this kind are used both in stationary systems and in mobile combustion systems. A further class of catalytic converter which has recently been at the focus of attention, especially for mobile use in motor vehicles, is that of zeolite-based catalytic converters. These catalytically active components include, more particularly, what are called iron- or copper-exchanged zeolites, preferably of the ZSM-5 (MFI), beta (BEA) or chabazite (CHA) type.

The catalytic converters used nowadays in motor vehicles are predominantly ceramic honeycomb catalytic converters. In operation, the exhaust gas to be cleaned flows through channels in the catalytic converter which has been extruded, for example.

A basic distinction is drawn here between what are called all-active extrudates and coated supports, known as "washcoats". In the all-active extrudates, a catalytically active catalyst material forms the extruded body, meaning that the channel walls of the catalytic converter are formed completely from a catalytically active material. In the washcoats, a catalytically inert, extruded support body is coated with the actual catalytically active catalyst material. This is effected, for example, by dipping the extruded support body into a suspension comprising the catalyst material.

In principle, the aim is a maximum catalytic activity in the catalytic converters, i.e. a maximum NOx conversion.

A significant factor for a maximum NOx conversion is very good contact between the off-gas to be cleaned and the catalytically active material. The catalytic conversion proceeds to a crucial degree in the near-surface region at the walls of the respective flow channel through which the exhaust gas flows. Especially in the case of all-active extrudate honeycomb catalysts in which the entire extruded body is comprised of catalytically active material, the effect of this is that comparatively large volume regions of the catalyst material remain unutilized for the NOx conversion.

The invention claimed is:

1. A catalyst article for oxidizing ammonia, the catalyst article comprising *a selective catalytic reduction* (*SCR*) *catalyst and* a composite heterogeneous extruded honeycomb having longitudinally extending parallel channels, which channels being defined in part by channel walls having a total longitudinal length, wherein the channel walls comprise a cellular ceramic and open pore structure including a periodic arrangement of porous cells, each porous cell defined by a cell wall comprising a catalytically active interface layer, with adjacent catalytically active interface layers being joined to one another to form the cellular ceramic and open-pore structure, wherein the cellular ceramic and open-pore structure is embedded in an inorganic matrix component, wherein at least some of which porous cells are defined at least in part by a cell wall comprising a catalytically active interface layer of a catalytically active material comprising a precious metal supported on particles of a support material, and wherein the inorganic matrix [material] *component* is at least substantially free of the catalytically active material of the catalytically active interface layers.

2. The catalyst article of claim 1, wherein the porous cells in the periodic arrangement are interconnected by windows between cells, which windows defining macropores.

3. The catalyst article of claim 1, wherein the porous cells in the periodic arrangement are substantially not interconnected by windows between cells.

4. The catalyst article of claim 1, wherein the support material for supporting the precious metal comprises ceria, titania, a crystalline molecular sieve, alumina, zirconia, a mixed oxide of ceria and zirconia or a mixture of any two or more thereof.

5. The catalyst article of claim 1, wherein the supported precious metal is a platinum group metal, gold or silver.

6. The catalyst article of claim 5, wherein the platinum group metal is platinum, palladium, or both platinum and palladium.

7. The catalyst article of claim 1, [further comprising an] *wherein the* SCR catalyst provided in a washcoat coated on at least part of a total length of the channel walls.

8. The catalyst article of claim 1, wherein the composite heterogeneous extruded honeycomb comprises a population of the porous cells embedded in the matrix, wherein the catalytically active interface layer comprise a mixture of [an] *the* SCR catalyst and precious metal supported on [a] *the* support material.

9. The catalyst article of claim 1, wherein the porous cells embedded in the inorganic matrix comprises (a) a first fraction of porous cells, wherein the catalytically active interface layer is a precious metal supported on [a] *the* support material, the support material comprising ceramically bonded particles of the support material joined to one another via sinter bridges; and (b) a second fraction of porous cells wherein the catalytically active interface layer comprises [an] *the* SCR catalyst.

10. The catalyst article of claim 1, wherein the SCR catalyst is a crystalline molecular sieve supporting a base metal promoter or vanadium compound supported on [a] *the* support *material* comprising titanium.

11. The catalyst article of claim 10, wherein the crystalline molecular sieve is an aluminosilicate zeolite and the supported base metal promoter is copper, iron or both copper and iron.

12. The catalyst article of claim 11, wherein the aluminosilicate zeolite has the MFI, BEA, CHA, AEI, FAU, AFX or ERI framework structure.

13. The catalyst article of claim 1, wherein the inorganic matrix component comprises an alumina phase, a silicate phase, an inorganic fibre phase or a combination of any two or more thereof.

14. The catalyst article of claim 13, wherein the silicate phase comprises a pillared clay and/or a diatomaceous earth.

[15. The catalyst article of claim 1, wherein the inorganic matrix component comprises 5 to 50% by weight of the catalyst.]

16. The catalyst article of claim 1, wherein the extruded honeycomb is in the form of a flow-through monolith.

17. The catalyst article of claim 1, wherein the extruded honeycomb is in the form of a wall-flow filter.

18. The catalyst article of claim 1, wherein the porosity of the composite heterogeneous extruded honeycomb is from 40 to 80%.

19. An exhaust system for an electrical power station or an internal combustion engine, which system comprising an inlet end and an outlet end[, the catalyst article of claim 1,] and a device for introducing ammonia or a precursor of ammonia into an exhaust gas flowing in the exhaust system in the direction of the inlet end from the outlet end, wherein [a] *the* catalyst article [for oxidizing ammonia] of claim 1 is located downstream of the device for introducing ammonia or a precursor of ammonia into an exhaust gas flowing in the exhaust system.

20. The exhaust system of claim 19, further comprising a substrate monolith comprising [an] *a further* SCR catalyst disposed between the device for introducing ammonia or a precursor of ammonia into an exhaust gas flowing in the exhaust system and the catalyst article for oxidizing ammonia.

21. A vehicle comprising an internal combustion engine and an exhaust system of claim 19.

22. The catalyst article of claim 1, wherein the catalytically active interface layer is substantially free of the inorganic matrix [material] *component*.

23. The catalyst article of claim 1, wherein the inorganic matrix [material] *component* is at least substantially free of any catalytically active material layer.

24. The catalyst article of claim 1, wherein the inorganic matrix [material] *component* comprises a second catalytically active material that is different than the catalytically active material in the [the] catalytically active material layer.

* * * * *